United States Patent
Hattenberger et al.

(10) Patent No.: US 9,165,223 B2
(45) Date of Patent: Oct. 20, 2015

(54) COMPENSATION FOR OPTICAL BRIGHTENERS OF PRINT MEDIA TO FACILITATE CALIBRATION OF A PRINTING SYSTEM

(75) Inventors: Edward Hattenberger, Firestone, CO (US); Jo S. Kirkenaer, Lyons, CO (US)

(73) Assignee: Ricoh Production Print Solutions LLC, Boulder, CO (US)

(*) Notice: Subject to any disclaimer, the term of this patent is extended or adjusted under 35 U.S.C. 154(b) by 296 days.

(21) Appl. No.: 13/493,829

(22) Filed: Jun. 11, 2012

(65) Prior Publication Data

US 2013/0329236 A1    Dec. 12, 2013

(51) Int. Cl.
| | |
|---|---|
| *H04N 1/60* | (2006.01) |
| *G03F 3/08* | (2006.01) |
| *G06K 15/02* | (2006.01) |
| *H04N 1/00* | (2006.01) |
| *G03G 15/00* | (2006.01) |

(52) U.S. Cl.
CPC ............ *G06K 15/027* (2013.01); *H04N 1/6008* (2013.01); *H04N 1/6094* (2013.01); *H04N 1/6097* (2013.01); *G03G 15/6585* (2013.01); *G03G 2215/00789* (2013.01); *G03G 2215/00805* (2013.01); *H04N 1/00002* (2013.01); *H04N 1/00068* (2013.01); *H04N 1/00087* (2013.01); *H04N 1/6002* (2013.01); *H04N 1/6077* (2013.01)

(58) Field of Classification Search
USPC .......................... 358/1.9, 3.03–3.2, 533–536
See application file for complete search history.

(56) References Cited

U.S. PATENT DOCUMENTS

| | | | | |
|---|---|---|---|---|
| 5,805,314 | A * | 9/1998 | Abe et al. ...................... | 358/518 |
| 6,671,050 | B2 | 12/2003 | Sugiyama et al. | |
| 6,717,672 | B2 * | 4/2004 | Tamagawa ..................... | 356/402 |
| 7,178,898 | B2 * | 2/2007 | Hoshino ......................... | 347/40 |
| 7,414,752 | B2 | 8/2008 | Adam et al. | |
| 7,466,417 | B2 | 12/2008 | Ehbets et al. | |
| 7,847,264 | B2 | 12/2010 | Wegmuller et al. | |
| 7,973,974 | B2 * | 7/2011 | Trelewicz et al. ............ | 358/3.06 |
| 8,150,280 | B2 * | 4/2012 | Omata ............................ | 399/45 |
| 8,159,719 | B2 * | 4/2012 | Bestmann ..................... | 358/3.01 |
| 8,164,788 | B2 * | 4/2012 | Wang et al. .................... | 358/1.9 |
| 8,310,718 | B2 * | 11/2012 | Chapman et al. ............. | 358/1.9 |
| 8,521,075 | B2 * | 8/2013 | Shiozawa ...................... | 399/341 |
| 8,749,845 | B2 * | 6/2014 | Kuo .................... | G03G 15/0849 283/92 |
| 8,805,217 | B2 * | 8/2014 | Kuo .......................... | H04N 1/54 399/40 |
| 2005/0083346 | A1 * | 4/2005 | Takahashi et al. ............ | 345/600 |
| 2005/0083540 | A1 * | 4/2005 | Hersch et al. .................. | 358/1.9 |
| 2006/0256361 | A1 | 11/2006 | Hayase et al. | |
| 2009/0284812 | A1 * | 11/2009 | Tsukamoto ................... | 358/518 |
| 2011/0095203 | A1 | 4/2011 | Suzuki et al. | |
| 2011/0102821 | A1 | 5/2011 | Baba | |
| 2011/0149316 | A1 * | 6/2011 | Omagari et al. ............... | 358/1.9 |

FOREIGN PATENT DOCUMENTS

| | | |
|---|---|---|
| JP | 2006084333 A1 | 3/2006 |
| JP | 2011155519 A | 8/2011 |

\* cited by examiner

*Primary Examiner* — Richard Zhu
(74) *Attorney, Agent, or Firm* — Duft Bornsen & Fettig LLP (57) ABSTRACT

Systems and methods are provided for compensating for optical brighteners found in print media while calibrating a printer. The system is able to determine reflectance values for a print medium, to determine reflectance values for a colorant applied to the print medium, and to alter the determined reflectance values for the colorant based on the reflectance values of the print medium. The system is further able to calibrate a printer that applied the colorant to the print medium based on the altered reflectance values.

20 Claims, 10 Drawing Sheets

CYAN
Halftone Level Calibration

| DESIRED OUTPUT | HALFTONE PATTERN |
|---|---|
| 5 | 1 |
| ... | ... |
| 10 | 3 |

↑ 902

MAGENTA
Halftone Level Calibration

| DESIRED OUTPUT | HALFTONE PATTERN |
|---|---|
| 5 | 5 |
| ... | ... |
| 10 | 10 |

↑ 904

YELLOW
Halftone Level Calibration

| DESIRED OUTPUT | HALFTONE PATTERN |
|---|---|
| 5 | 1 |
| ... | ... |
| 10 | 7 |

↑ 906

BLACK
Halftone Level Calibration

| DESIRED OUTPUT | HALFTONE PATTERN |
|---|---|
| 5 | 12 |
| ... | ... |
| 10 | 17 |

COMPENSATION FOR OPTICAL BRIGHTENERS OF PRINT MEDIA TO FACILITATE CALIBRATION OF A PRINTING SYSTEM

FIELD OF THE INVENTION

The invention relates to the field of printing, and in particular, to calibrating the output of colorant of a printing system.

BACKGROUND

In the field of printing, it remains desirable for printers to accurately and precisely portray colors. If a printer fails to apply the correct amounts of colorant (e.g., ink, toner, etc.) to a print medium (e.g., paper), then colors may appear improperly shifted in hue, certain colors may have unexpected changes in brightness, and the printed output may be different than expected. For example, photographic images printed by a printer that has not been properly calibrated may appear unrealistic because the colors generated by the printer do not match the colors intended for printing.

In order to address these issues, printers are typically calibrated and then profiled in order to ensure that their printed colors accurately match the colors indicated in print data. Typically, the process of external calibration is performed via a spectrophotometer. The printer places a calibration patch onto the print medium for each of its loaded colorants (e.g., cyan, magenta, yellow, and black). Each calibration patch includes multiple sections of different intensity, and each section includes colorant that is substantially uniformly dispersed onto the medium. The spectrophotometer analyzes the spectral response of the sections of each calibration patch, and a determination is made as to whether each section sufficiently matches an expected color. If the color for a section is not accurate (i.e., is too bright, too dark, not the correct hue, etc.), then halftone patterns used to apply the colorant to that section may be adjusted accordingly. For example, if a section of colorant is expected to be an intense yellow, but is not sufficiently yellow as applied to the page, a different halftoning pattern can be used by the printer to apply the colorant more densely. This disperses more colorant onto the printed medium and makes the section appear more deeply yellow. Once the calibration has been completed, the printer may accurately apply each colorant at the appropriate levels to generate desired colors. Profiling may then be performed in order to determine how to accurately blend different colorants to form new hues.

The calibration and profiling of a printer is not simply a process that can be performed once and then forgotten. As environmental conditions vary, and as the printer itself is exposed to wear and the passage of time, the printer may need to be re-calibrated and profiled on a regular basis.

Presently, many forms of print media include optical brighteners that enhance their perceived white color and brightness. These optical brighteners actually increase the reflectance of the medium with regard to blue and ultraviolet wavelengths of light (e.g., wavelengths roughly between about 390 and 480 nanometers). Because optical brighteners add a blue component to the light that they reflect, optical brighteners can impact the way that colorants applied to the medium are measured by a spectrophotometer. This is particularly true for yellow colorants, because yellow is complementary to blue. This is also particularly true when small amounts of colorant are applied to a section of print medium in order to generate pale or light colors.

For example, in order to create a portion of what appears to be continuous color on a print medium, printers typically apply halftone patterns of pels that are placed onto the print medium in a uniform manner. Each pel within the halftone pattern is separated from its neighbors by blank portions of the print medium that remain uncovered by the colorant. Because the optical brighteners in the blank portions are slightly blue, the overall hue of the halftone pattern of colorant applied to the print medium skews closer to blue. Even when colorant is applied so as to completely cover the print medium, most colorants are translucent and therefore the blue color may continue to shine through the colorant. This makes the printed result appear slightly blue and less like the color intended for printing.

Figure 1:
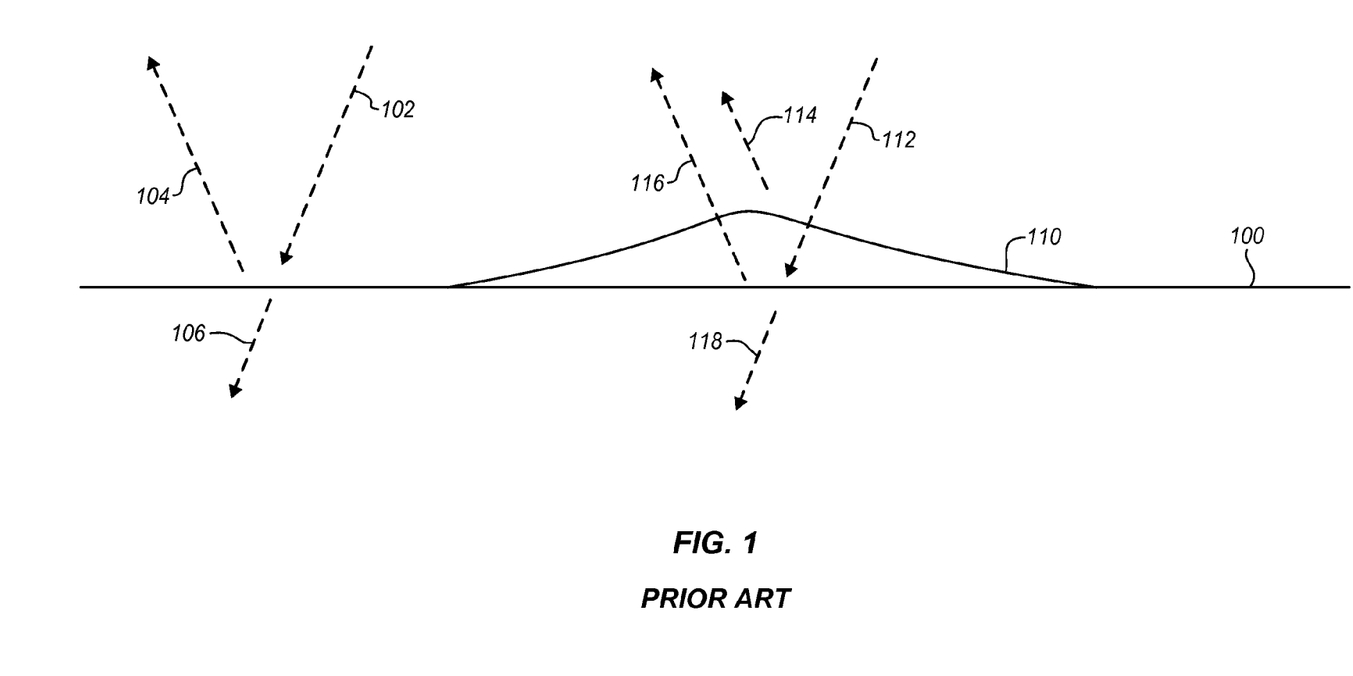
FIG. 1 is a block diagram of a print medium that includes a droplet of applied colorant in an exemplary embodiment.

FIG. 1 illustrates the discussion provided above. As illustrated in FIG. 1, a print medium 100 includes a single pel of colorant, indicated as droplet 110, which is partially translucent. Normally, incident light 102 that is applied to medium 100 is reflected by medium 100 as light 104, which may then be measured by a spectrophotometer. The wavelengths of incident light 104 that are reflected naturally depend on the characteristics of medium 100 itself. Medium 100 is also likely to allow a certain amount 106 of incident light 102 to pass through it. Similarly, for droplets of most colorants, incident light 112 is partly reflected by the colorant itself as light 114. Additionally, a certain amount of incident light 112 passes through the colorant of droplet 110, and is reflected by medium 100 as light 116. Still further, a certain amount 118 of incident light 112 passes through both medium 100 and droplet 110. Thus, the light measured by the spectrophotometer includes light 114, which has been reflected by the colorant, as well as light 116, which has been reflected by medium 100. When optical brighteners are used, light 104 from non-colored sections of the page, as well as light 116, may skew the color of a given section of a page towards blue.

As presently practiced, it is undesirable to use a spectrophotometer to calibrate print media that include optical brighteners. This is because for yellow colors, the calibration process may attempt to completely cover the paper with yellow colorant in order to compensate for the blue color of the print medium and make the section look less green (assuming the calibration process does not fail entirely). This is unacceptable because such a calibration process turns pale yellows into intense yellows, resulting in inaccurate representations of color. Thus, an alternative method is presently used for calibration of print media that include optical brighteners. The alternative method involves using a UV-cut filter to substantially eliminate the measured reflectance of a calibration patch for blue wavelengths of light. This allows for the calibration to be completed without error, but unfortunately can result in inaccurate color calibration, because the calibration process does not take into account contributions to hue and intensity caused by reflected blue light.

SUMMARY

Embodiments described herein use reflectance values of a print medium in order to compensate for measured reflectance values of colorants that are applied to the print medium. For example, if a print medium that includes optical brighteners has a reflectance above a threshold, measured reflectance values for colorants used on the print medium may be reduced prior to calibration, so that the calibration process is not unduly affected by the presence of the optical brighteners. Thus, even though the blue component of reflectance is considered during the calibration process, the impact of the blue component on the calibration process is limited. This avoids color calibration problems caused by ignoring the reflectance of a colorant in blue wavelengths, which would otherwise impact the way that colors are presented. Furthermore no specialized UV-cut filters or other components are required for this process, because a standard full spectrum spectrophotometer may be used to take measurements.

One embodiment is a system that compensates for the presence of optical brighteners in print media. The system comprises a controller operable to determine reflectance values for a print medium, to determine reflectance values for a colorant applied to the print medium, and to alter the determined reflectance values for the colorant based on the reflectance values of the print medium. The controller is further operable to calibrate a printer that applied the colorant to the print medium based on the altered reflectance values.

Another embodiment is a method for compensating for the presence of optical brighteners in print media. The method comprises determining reflectance values for a print medium, determining reflectance values for a colorant applied to the print medium, and altering the determined reflectance values for the colorant based on the reflectance values of the print medium. The method further comprises calibrating a printer that applied the colorant to the print medium based on the altered reflectance values.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 2:
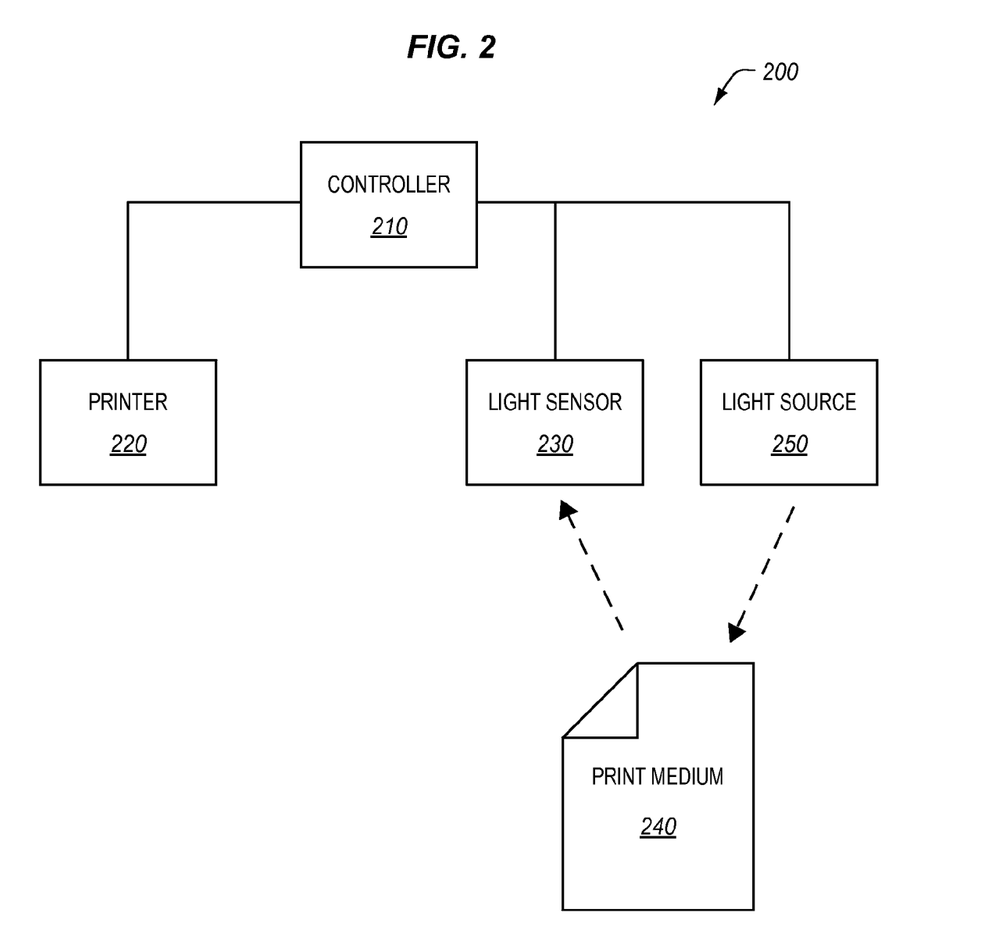
FIG. 2 is a block diagram illustrating a calibration system color calibrating a printer in an exemplary embodiment.

FIG. 2 is a block diagram illustrating a calibration system for color calibrating a printer in an exemplary embodiment. The calibration system comprises any components, devices, or combinations thereof operable to perform color calibration for one or more printers. Furthermore, the calibration system of FIG. 2 has been enhanced in order to detect the presence of optical brighteners in a print medium, and to adjust measured reflectance values of colorant applied to the print medium in order to account for the presence of the optical brighteners. In this embodiment, the calibration system includes light sensor 230, which measures reflectance of light source 250 off of print medium 240, and the calibration system also includes controller 210, which performs a calibration of printer 220 based on received data from light sensor 230.

Controller 210 comprises any system, component, or device operable to utilize measured reflectance values for print medium 240 in order to perform color calibration for printer 220. For example, controller 210 may comprise a hardware processor or custom circuitry implementing logic, instructions stored in a memory, etc. for performing the color calibration process. In this embodiment, controller 210 is operable to receive data from light sensor 230, and is further operable to provide color calibration data for use by printer 220. Controller 210 is enhanced so that it may alter reflectance values measured by light sensor 230 before calibration occurs. When calibration utilizes the altered reflectance values (instead of the originally measured values), issues of color skew caused by the optical brighteners may be minimized. Controller 210 may be an integral part of printer 220 (e.g., a print controller), may be integral with light sensor 230 (e.g., as a processor managing the operations of light sensor 230), or may be a component that is entirely separate from both.

Printer 220 comprises any system, component, or device operable to apply colorant to print medium 240. For example, printer 220 may comprise a continuous-form printer or a cut-sheet marking engine, may utilize components for laser printing or inkjet printing, etc. Printer 220 will typically be controlled by a print controller, and will apply marks to print medium 240 based upon instructions received from the print controller.

Light sensor 230 comprises any system, component, or device operable to sense visible light reflected by print medium 240, and to generate electrical signals based upon the sensed visible light. Typically, light sensor 230 will comprise a spectrophotometer or other device operable to measure the reflectance of print medium 240 at different wavelengths of light.

Print medium 240 comprises any component or material capable of holding or otherwise containing/affixing colorant applied by printer 220. Print medium 240 may, for example, be paper, cloth, plastic, etc.

Light source 250 comprises any system, component, or device operable to apply light to print medium 240. Print medium 240 may then reflect the applied light to light sensor 230, allowing light sensor 230 to determine the reflectance of print medium 240 at various wavelengths. In one embodiment, light source 250 applies the entire visible spectrum of light to print medium 240 at once, thereby allowing light sensor 230 to measure the reflectance of print medium 240 at multiple wavelengths at once. In another embodiment, light source 250 may be calibrated to emit different wavelengths of light based upon a programmed input from light sensor 230.

In some embodiments, light source 250 comprises the lights of the room in which print medium 240 has been placed for analysis by light sensor 230. Thus, it may be desirable to adjust the calibration process to account for skewed reflectance values if light source 250 is not a full-spectrum light source. For example, if light source 250 is a fluorescent light-source, it may have substantially larger blue spectral components than yellow and/or red spectral components. Thus, the calibration process applied by controller 210 may scale measured reflectance values in those wavelengths appropriately to account for this issue.

Further details of the operation of calibration system 200 will be discussed with regard to FIG. 3. Assume, for this embodiment, that printer 220 has generated a calibration sheet. The calibration sheet includes a number of calibration patches, and each calibration patch includes different sections of colorant that are each substantially uniform in color density. These sections are intended for measurement by light sensor 230 during calibration.

Figure 3:
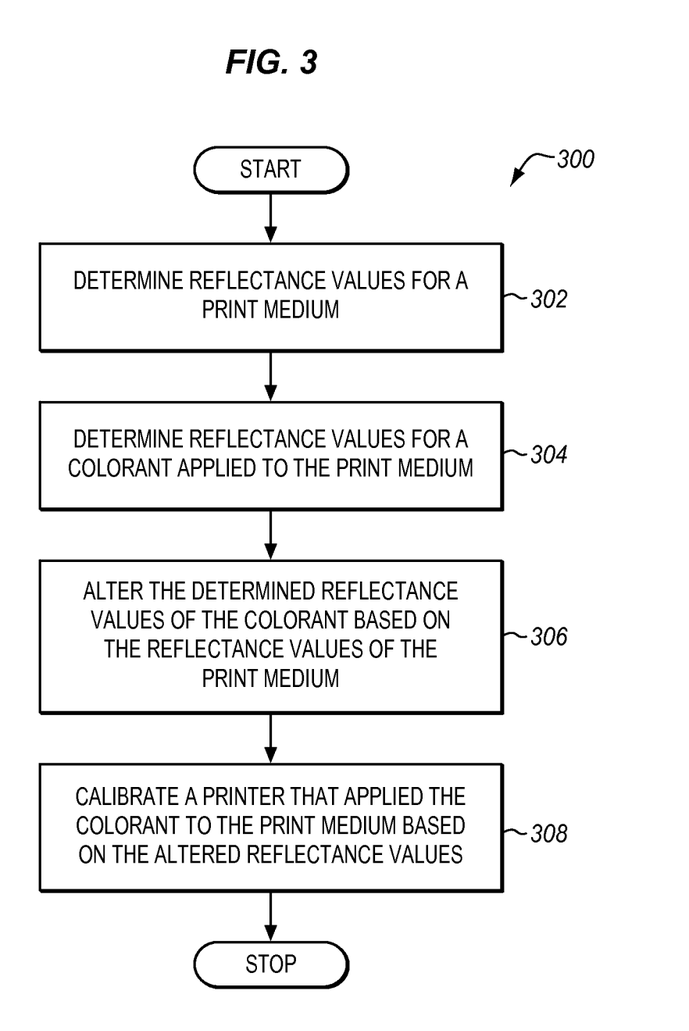
FIG. 3 is a flowchart illustrating a method for reducing the impact of optical brighteners during color calibration of a printer in an exemplary embodiment.

FIG. 3 is a flowchart illustrating a method for reducing the impact of optical brighteners during color calibration of a printer in an exemplary embodiment. The steps of method 300 are described with reference to calibration system 200 of FIG. 2, but those skilled in the art will appreciate that method 300 may be performed in other systems. The steps of the flowchart described herein are not all inclusive and may include other steps not shown. The steps described herein may also be performed in an alternative order.

In step 302, controller 210 determines reflectance values for print medium 240. Determining the reflectance values may be performed by initiating spectrographic analysis of print medium 240 by light sensor 230, and then acquiring the results of the analysis from light sensor 230. The spectrographic analysis process comprises determining a measured spectral response (i.e., measured reflectance) at light sensor 230 as it receives incident light that has been reflected off of print medium 240. During this process, reflectance at a variety of wavelengths may be measured, and the reflectance is likely to vary as a function of wavelength. Typically, the wavelengths measured by light sensor 230 will comprise the entire range of visible light (i.e., about 380-740 nanometers), although some segment thereof may also be appropriate. Furthermore, certain ranges of colors in the visible light spectrum may be more precisely and/or densely measured than others. For example, wavelengths between 390 and 480 nanometers (nm) may be sampled at intervals of 10 nm and with a precision of plus or minus one tenth of a percent, while other colors may be sampled at intervals of 15 or 20 nm and with a precision of plus or minus one percent. The initial analysis is performed upon the print medium itself (i.e., the blank, empty, and/or uncolored regions of the print medium), and may be performed upon the calibration sheet if there is sufficient uncolored blank space on the calibration sheet. For example, there may be a predefined section of the calibration sheet that intentionally uncolored and used for analysis.

In one embodiment, during the analysis process, light sensor 230 controls the output of light source 250 and adjusts the wavelength and/or intensity of light emitted by light source 250. In such an embodiment, light sensor 230 may block outside light from illuminating print medium 240 in order to ensure that no unanticipated light sources skew the measured reflectance values of print medium 240 at various wavelengths.

Controller 210 may further analyze the measured reflectance values of print medium 240 to determine if optical brighteners have been added to print medium 240. In one embodiment, a reflectance value in a substantially blue spectrum (corresponding to wavelengths of about 390 nm-480 nm) that is measured above a threshold indicates the presence of optical brighteners in print medium 240.

In step 304, controller 210 determines reflectance values for a colorant applied to print medium 240. Thus, in a similar fashion to step 302 described above, controller 310 may direct the operations of light sensor 230 in order to determine the spectral response of one or more sections of the colorant at calibration patches of the calibration sheet. Because the colorant has been dispersed onto print medium 240, reflectance of light off of blank portions of print medium 240 will contribute to the measured reflectance values.

In step 306, controller 210 alters the measured reflectance values of the colorant (as determined in step 304) based on the reflectance values of the print medium. This may be performed, for example, responsive to determining that the calibration sheet was printed onto a print medium 240 that includes optical brighteners. Altering the reflectance values for the colorant applied to the print medium may include any of a variety of techniques for processing measured data such as clipping/thresholding the data, smoothing the data, attenuating the data, etc. Typically, the reflectance values for all sections of colorant (i.e., each color) of the calibration sheet will be altered to account for the optical brighteners. However, in some embodiments, the measured spectral response of only certain colorants and/or sections (e.g., pale sections of yellow that utilize only small amounts of colorant) may be altered by controller 210.

In one embodiment, altering the reflectance values of the colorant comprises determining wavelengths (particularly those in the range of wavelengths used by the optical brighteners) at which measured reflectance values for the blank print medium exceed a threshold. For these wavelengths, the measured reflectance of a section of colorant applied to the print medium (a different set of measurements corresponding to a colored section of a calibration patch, and not the blank print medium itself) may be reduced to the threshold value. Further, a smoothing algorithm, such as a Gaussian filter, may be applied to the measured reflectance data in order to ensure that no rough transitions are cause by the thresholding operation.

In another embodiment, a tiered form of thresholding may be applied to reduce the impact of the optical brighteners. For example, controller 210 may alter the reflectance value of a section of colorant at each wavelength using the following method. First, controller 210 may determine measured reflectance of the print medium (P) for the wavelength. Next, controller 210 may compare P to a predefined first threshold value (T1). If P is larger than T1, controller 210 may reduce the reflectance value of the section of colorant in the wavelength by a first factor (F1). If P is not larger than T1, controller 210 may compare P to a predefined second threshold value (T2). If P is greater than T2, controller 210 may reduce a measured reflectance value of the section of colorant in the wavelength by a second factor (F2).

In another embodiment, measured reflectance values for colorant that have been attenuated may be "shifted" towards shorter wavelengths. For example, controller 210 may determine an amount that the measured reflectance values of the colorant have been reduced within substantially blue wavelengths as a part of the attenuation process. Controller 210 may further increase the measured reflectance values at shorter wavelengths than blue (e.g., less than about 390 nm or 380 nm) by a corresponding amount, although not so much as to cause an unduly large peak in such regions.

In step 308, controller 210 calibrates printer 220, which applied the sections of colorant to the print medium. The color calibration is performed based on the altered reflectance values for the colorant. During color calibration, halftone patterns of a printer that are used to define the density, arrangement, and/or size of pels of colorant applied to a section of a calibration patch may be correlated to measured optical densities, Status A values, Status T values, CIELAB L* values, or other metrics. An optical density may be determined by those of ordinary skill in the art based on the altered reflectance values for a section of a calibration patch. Thus, if a section of a calibration patch is expected to have a certain optical density, but exhibits a different optical density after spectral analysis by light sensor 230, calibration data for the halftone pattern used to generate that section of colorant may be changed. For example, data in memory may be altered to correlate the halftone pattern with the measured optical density. The next time the section is printed, a different halftone pattern (having a different optical density) can be used, and the colorant will therefore appear less or more intense within the section as desired. Controller 210 may communicate with printer 220 in order to determine which halftone pattern was used to generate each section, or if controller 210 manages the printing operations of printer 220, such a query may not be necessary (because controller 210 may already store such halftoning information).

Utilizing method 300 of FIG. 3, printer 220 may be calibrated to effectively use print medium 240 that includes optical brighteners, while still taking into account at least some of the reflectance of different sections of calibration patches at, for example, blue wavelengths of light.

Figure 4:
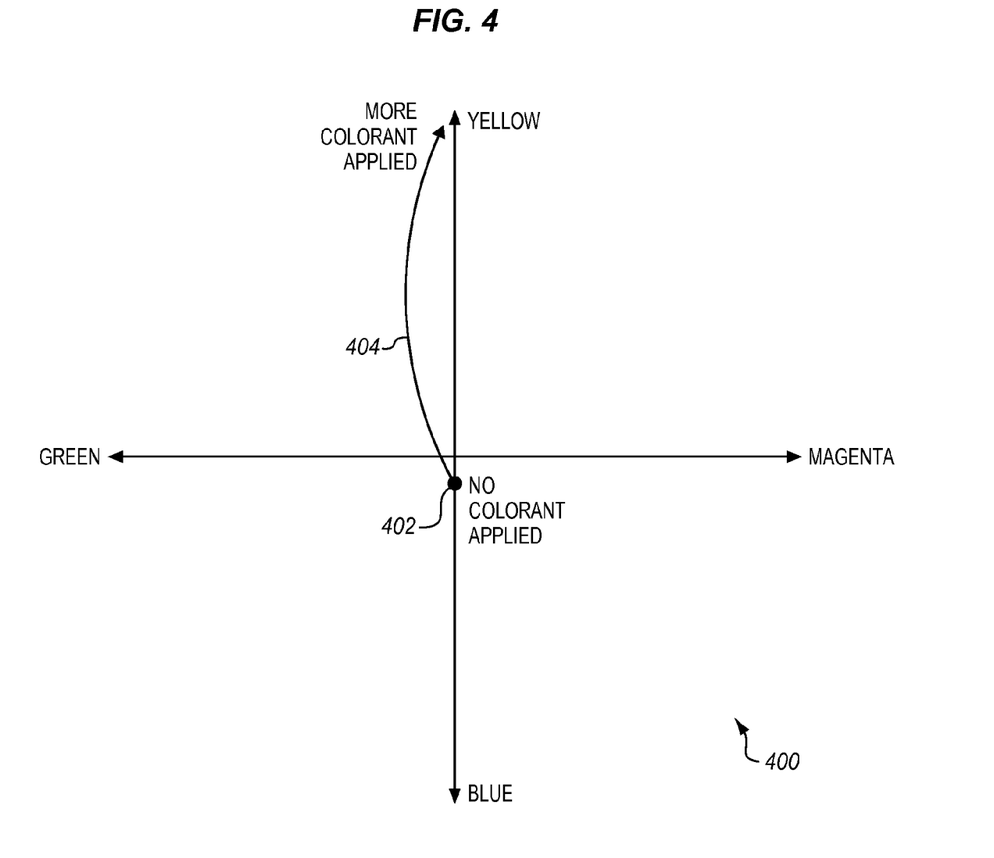
FIG. 4 is an opponent color space diagram indicating the application of yellow colorant to a medium that includes optical brighteners in an exemplary embodiment.
Figure 5:
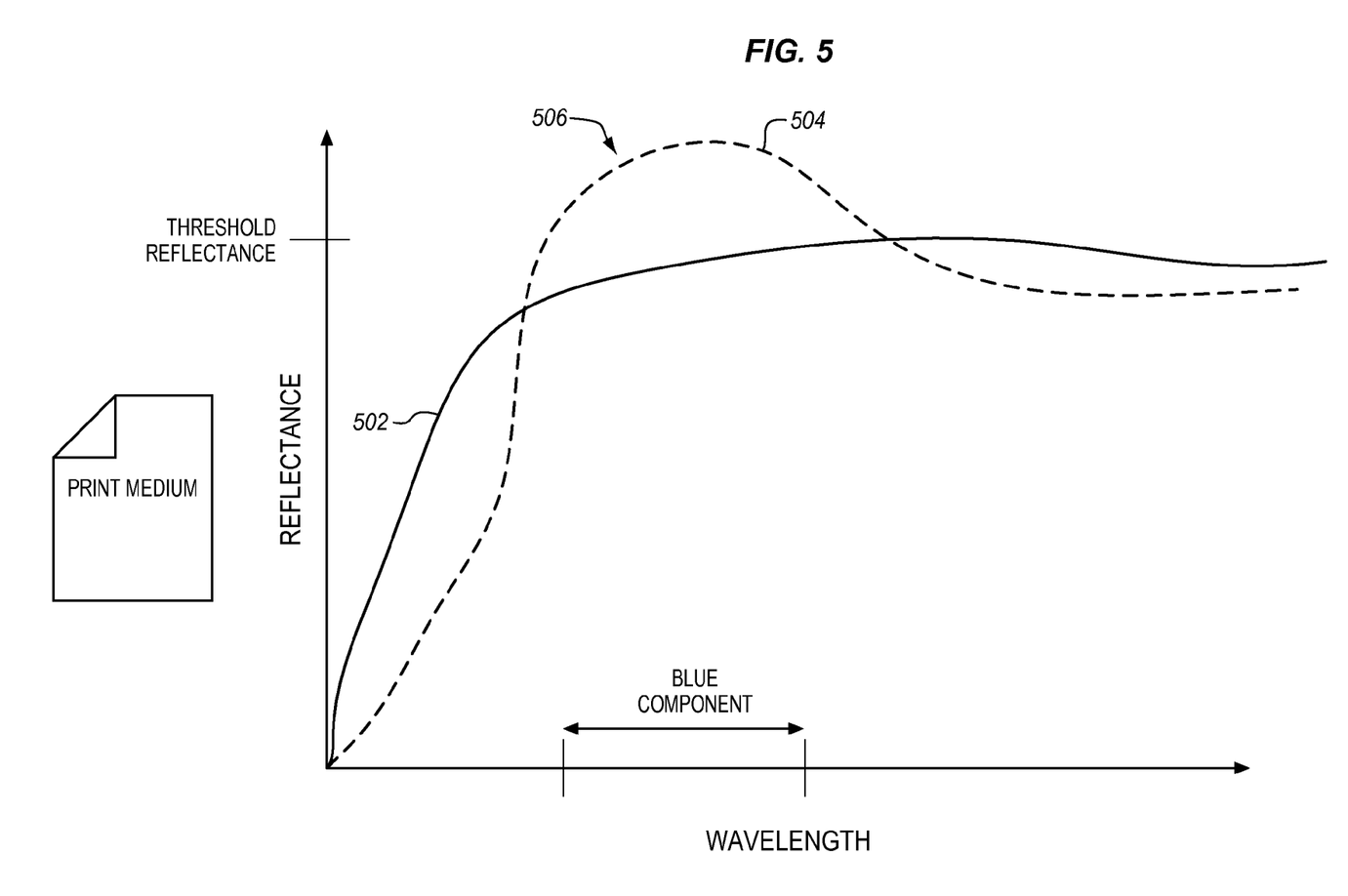
FIG. 5 is a diagram illustrating the reflectance of different print media as a function of wavelength in an exemplary embodiment.

FIGS. 4-5 illustrate the existing problems in color calibrating a print medium that includes optical brighteners, to provide a better understanding of the issues addressed by the systems and methods discussed above. FIG. 4 is an opponent color space diagram 400 indicating the application of yellow colorant to a medium that includes optical brighteners in an exemplary embodiment. FIG. 4 uses the opponent color space to illustrate the existing problems with attempting to calibrate a printer using known techniques. An opponent color space similar to CIELAB uses different axes for different opponent color directions. Opponent colors may also be referred to as complementary colors. For example, yellow and blue are opponent colors, green and magenta are opponent colors, etc. Thus, in opponent color space diagram 400, the vertical axis indicates the transition from yellow to blue, while the horizontal axis indicates the transition from green to red.

Curve 404 is used to indicate how the apparent hue of a print medium that includes optical brighteners changes as more colorant is applied to the print medium. Specifically, origin 402 of curve 404 shows that the hue of the print medium without any yellow colorant applied appears slightly blue. As yellow colorant is added to the print medium, progress continues along curve 404 in the direction indicated by the arrow of curve 404. Curve 404 shows that adding yellow colorant to the print medium does not only shift the color of the media from blue to yellow, it also shifts the color closer to green (i.e., the combination of yellow colorant and blue media). As more yellow colorant is added, the yellow starts to overpower the blue, making the overall color appear more yellow and less green. However, increasing the amount of yellow colorant to drown out the perceived green color means that the intensity of the calibrated color is inaccurate (it is no longer pale, but rather becomes much more intense). This shows why previous calibration techniques using full-spectrum analysis often achieved non-optimal results. Some calibration techniques would apply a vast amount of yellow colorant to cover up the blue brighteners, which would mean that many yellows that were meant to be pale would in fact appear very intense and saturated especially in highlights.

FIG. 5 is a diagram illustrating the reflectance of different print media as a function of wavelength in an exemplary embodiment. In FIG. 5, two different curves are provided indicating the reflectance of different print mediums as a function of wavelength. In this figure, curve 502 illustrates how a print medium that does not include optical brighteners reflects light. Curve 502 as illustrated shows that the reflectance values in the visible light spectrum generally increase as the wavelength increases until reaching a substantially uniform value. In contrast, curve 504 illustrates how an exemplary blank print medium that includes optical brighteners reflects the same received light. Curve 504 as illustrated shows that reflectance for the medium having optical brighteners peaks substantially higher than for print media that do not include optical brighteners. In particular, the highest reflectance values are for wavelengths that are substantially blue (e.g., about 390-480 nanometers). This peak reflectance 506 is larger than a predetermined threshold value (e.g., 100% reflectance). Because of this, a controller may decide to adjust reflectance data acquired from calibration patches printed onto such print media in order to ensure that the calibration process does not cause any color skew.

Figure 6:
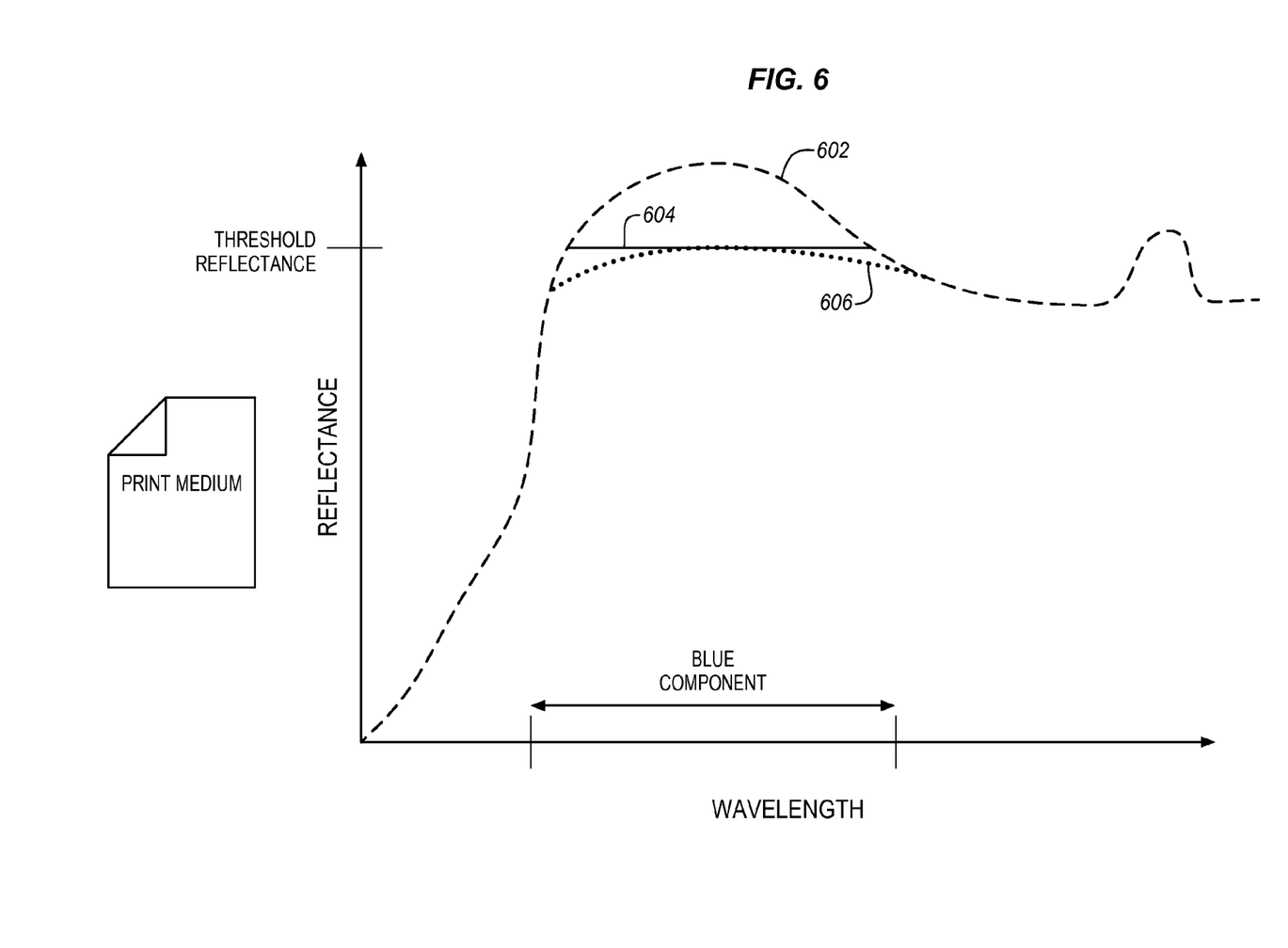
FIG. 6 is a diagram illustrating reflectance values for yellow colorant applied to a print medium that have been modified to reduce the impact of blue optical brighteners during a color calibration process for a printer in an exemplary embodiment.

FIG. 6 illustrates how a print medium that includes optical brighteners can be calibrated utilizing method 300 of FIG. 3 described above. FIG. 6 is a diagram illustrating reflectance values for yellow colorant applied to a print medium that have been modified to reduce the impact of blue optical brighteners during a color calibration process for a printer in an exemplary embodiment. According to FIG. 6, an originally measured set of reflectance values for a section of a yellow color calibration patch is depicted as curve 602. Curve 602 shows that the spectral peak in reflectance indicated by yellow colorant added to the print medium is overshadowed by the peak in blue reflectance caused by the optical brighteners. Thus, in normal calibration processes (assuming that the calibration process did not fail), a controller would determine that a great deal more yellow colorant was needed in order to overcome the spectral reflectance of the blue optical brighteners and shift the hue closer towards true yellow. However, this would result in the yellow being much more intense than intended by the color profile used for calibration, meaning the yellow color would still be inaccurately represented, even after calibration. To overcome this issue, curves 604 and 606 illustrate exemplary ways in which the measured reflectance for a section of a calibration patch can be altered to lessen the impact of optical brighteners on the calibration process, without entirely ignoring spectral reflectance at substantially blue wavelengths.

For curve 604, any measured reflectance values for the calibration patch along substantially blue wavelengths that are above the threshold value in the originally measured blank print medium are reduced to the threshold value. In such cases, the transitions in reflectance between reduced values and measured values in reflectance may appear to be sharp and not smooth transitions. To combat this issue, a smoothing filter such as a one dimensional Gaussian may be applied to the boundaries between the reduced regions and the non-reduced regions, in order to make the transition between reduced and non-reduced regions less noticeable.

For curve 606, while the reflectance values of the blue wavelengths are attenuated, overall shape of the originally measured reflectance values in substantially blue wavelengths is maintained. However, the peak in reflectance of these blue wavelengths is adjusted so that it reaches but never exceeds the defined threshold value of reflectance. The rest of the reflectance values at substantially blue wavelengths are scaled accordingly to ensure smooth transitions between the peak and non-attenuated regions of reflectance data.

When reflectance values in the blue wavelengths have been adjusted according to the methods described above, the reflectance peak of the yellow colorant more easily distinguishes (during calibration) from the blue reflectance peak, thereby ensuring that yellow colorant is not over-applied during calibration to compensate for the optical brighteners of the print medium.

Figure 7:
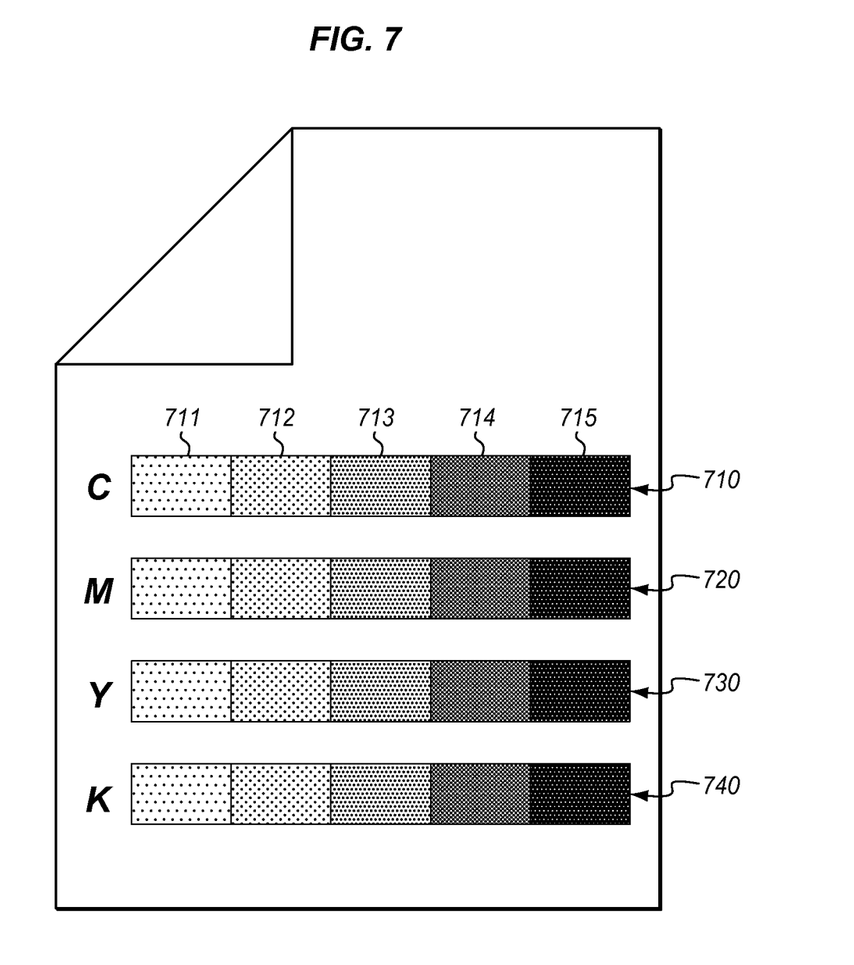
FIG. 7 is a block diagram illustrating a series of color calibration patches in an exemplary embodiment.

FIG. 7 is a block diagram illustrating a series of color calibration patches 710, 720, 730, and 740 in an exemplary embodiment. According to FIG. 7, each calibration patch (e.g., for colorants of Cyan (C), Magenta (M), Yellow (Y), and Black (K)) includes multiple clearly differentiated sections (e.g., sections 711-715 of calibration patch 710). Each section includes a uniformly dispersed amount of colorant (e.g., according to a predefined halftone pattern). For example, within each section, the same halftone pattern may be used to ensure that the colorant appears to the human eye to be a substantially uniform and continuous color. Each halftone pattern used for a section may be expected to correspond to a known optical density. However the actual optical density of the section may be more or less than desired (indicating a need for calibration). By analyzing each section of a calibration patch, a controller may determine how halftone patterns used by a printer should be reprogrammed in order to ensure that the proper color intensities are output by the printer. For example, the reflectance values can be used to determine the optical density of a given section of a calibration patch. Converting sets of measured reflectance values to optical density values may be performed in accordance with, for example, the standards listed in ISO 13660, or may be otherwise determined. Note that the exact number of sections in a calibration patch, and amount of variation in halftone patterns between sections, may vary as a matter of design choice.

Figure 8:
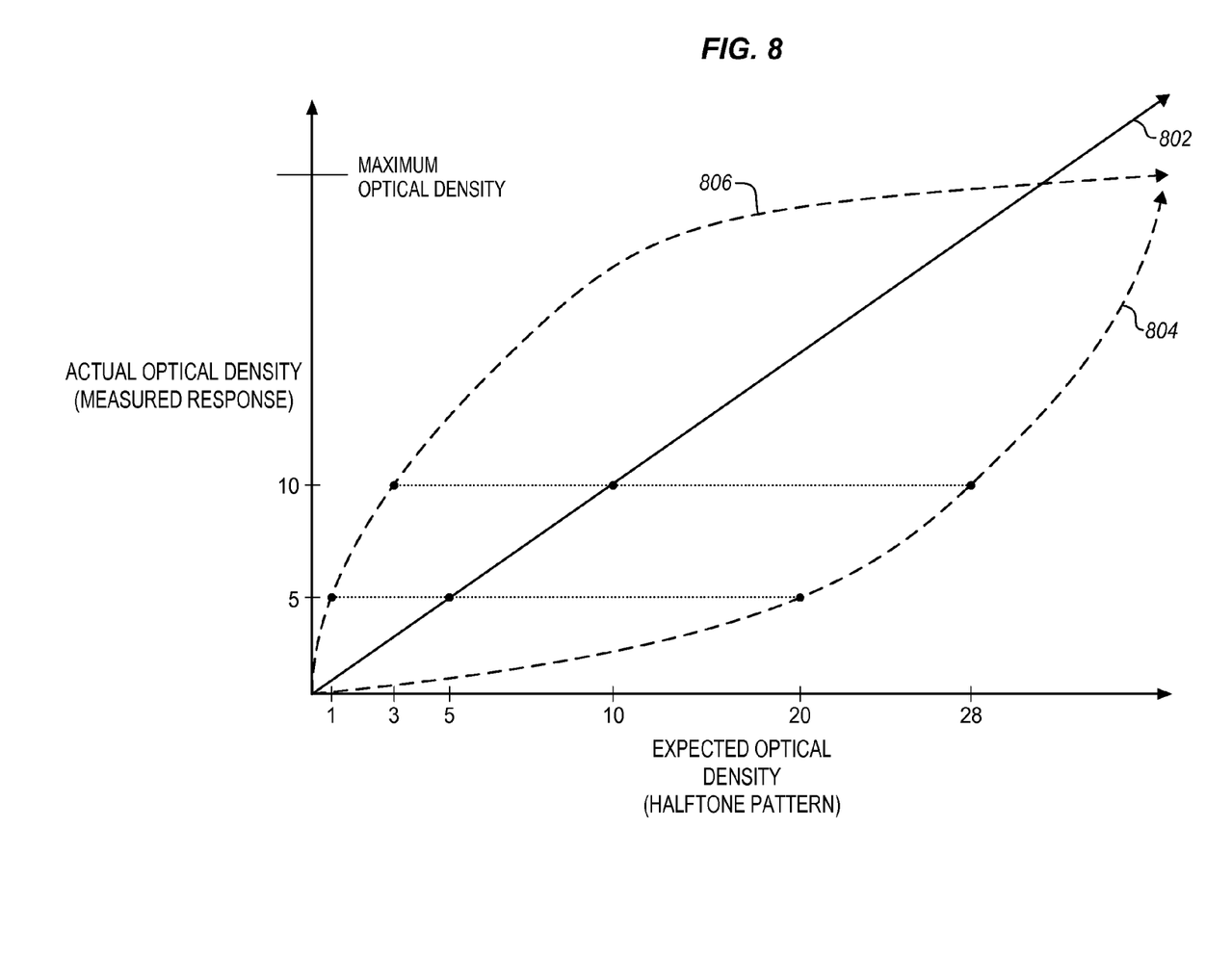
FIG. 8 is a diagram illustrating a correlation of an expected optical density for a halftone pattern of colorant to a measured optical density for a colorant applied by a printer in an exemplary embodiment.

FIG. 8 is a diagram illustrating a correlation of an expected optical density for a halftone pattern of colorant to a measured optical density for the colorant in an exemplary embodiment. According to FIG. 8, each halftone pattern may be associated with a number, and each numbered halftone pattern may be expected to provide a specific optical density of colorant. For example, the expected correlation of numbered halftone patterns to optical density may be a linear curve such as curve 802. Thus, halftone pattern five may be expected to result in an optical density of five, and halftone pattern ten may be expected to result in an optical density of ten. However, depending upon the ambient environmental conditions, as well as the wear and overall condition of the printer and/or print medium, the halftone levels may correlate quite differently to perceived optical density.

For example, curve 804 illustrates a situation where the printer provides less colorant onto the page than expected, meaning that the correlation of numbered halftone patterns to optical densities should be adjusted to use much higher numbered (i.e., denser) halftone patterns. Thus, to achieve an optical density of five, halftone pattern twenty may be needed, while to achieve an optical density of ten, halftone pattern twenty eight may be required.

In another example, curve 806 illustrates a situation where the printer provides more colorant onto the page than expected, meaning that the default correlation of halftone patterns to optical densities should be adjusted to use much lower numbered (i.e., less dense) halftone patterns. Thus, to achieve an optical density of five, halftone pattern one may be needed, while to achieve an optical density of ten, halftone pattern three may be required.

Based upon the known correlations between optical density and numbered halftone patterns for each section of each calibration patch, a controller may perform a linear, quadratic, or other interpolation in order to determine which halftone patterns of the printer should be used to achieve each desired optical density. This information may then be stored, for example, in a lookup table, such as depicted in FIG. 9.

Figure 9:
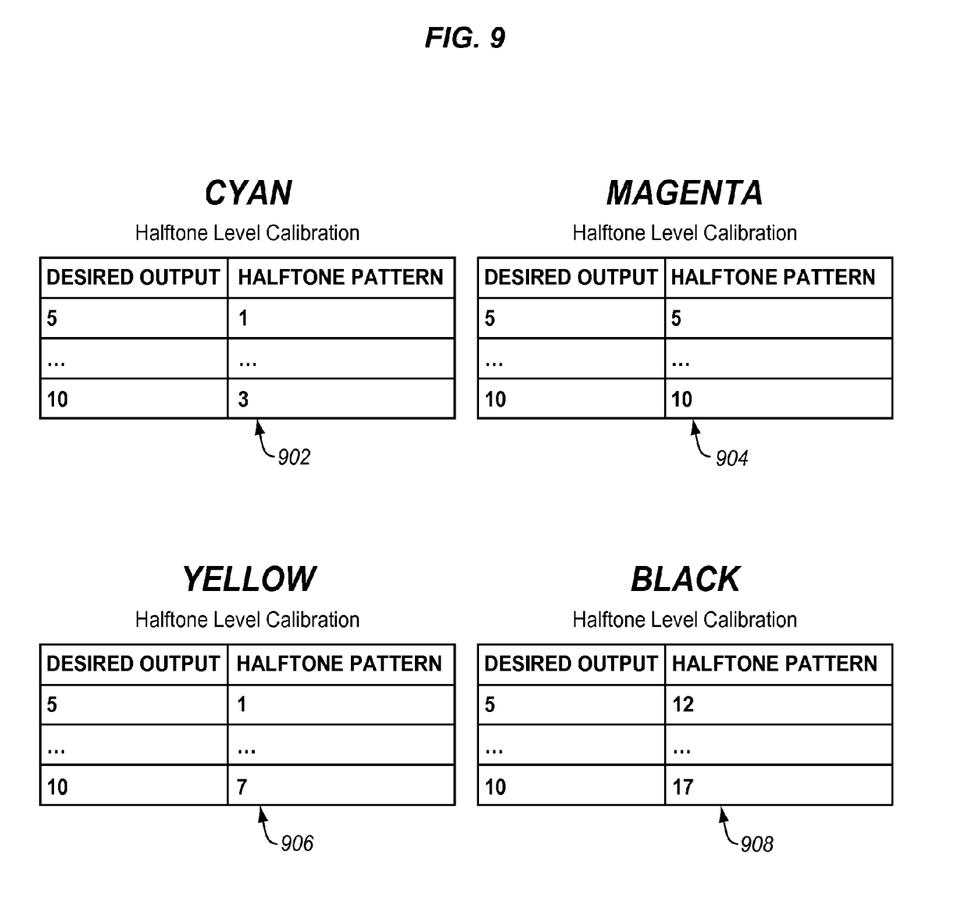
FIG. 9 is a block diagram illustrating halftone mapping tables used to correlate optical densities with halftone patterns in an exemplary embodiment.

FIG. 9 is a block diagram illustrating halftone mapping tables used to correlate optical densities with numbered halftone patterns in an exemplary embodiment. According to FIG. 9, a different halftone mapping table is used for each colorant. For example, mapping table 902 is used for Cyan colorant, mapping table 904 is used for Magenta colorant, mapping table 906 is used for Yellow colorant, and mapping table 908 is used for Black colorant. Note that between mapping tables, the correlation between desired output optical density and selected halftone pattern may vary.

EXAMPLES

In the following examples, additional processes, systems, and methods are described in the context of a calibration system used to color calibrate a printer. Assume, for this example, that the print medium used in this scenario includes substantially blue/white optical brighteners.

According to the example, a sheet of paper is received that includes optical brighteners which are substantially blue. The sheet also includes calibration patches for cyan, magenta, yellow, and black colorants. A spectrophotometer reviews the sheet and determines the spectral response (i.e., reflectance) of the print medium at a blank and uncolored portion. The print medium includes a large peak (P) of reflectance in substantially blue wavelengths, which indicates a reflectance of more than 100% and is higher than a threshold (T). Thus, the controller determines that alteration of reflectance data is appropriate in order to account for the optical brighteners. When the spectrophotometer measures sections of the calibration patch, the controller performs a reduction algorithm upon the measured reflectance values. In this example, the reduction algorithm is performed only upon the yellow calibration patch, and only upon pale sections of the yellow calibration patch. In these pale sections of yellow colorant, the reduction algorithm multiplies the measured reflectance in substantially blue wavelengths by a factor T/P. Thus, the reflectance values in the blue wavelengths peak at the threshold, but never rise above it. In a further embodiment, the reduction algorithm determines T/P, but the reduction is scaled in the blue wavelengths, such that the edges of the blue wavelengths are closer to the true measured values, while the blue wavelengths are more strongly scaled. Such an algorithm for scaling could be defined by the following formulae:

For wavelengths of less than 390 nm:

$$f(\lambda_{new}) = f(\lambda_{measured})$$

For wavelengths of 390 nm to 435 nm:

$$f(\lambda_{new}) = f(\lambda_{measured}) * \frac{T}{P} + f(\lambda_{measured}) * \left(1 - \frac{T}{P}\right) * \frac{(435 \text{ nm} - \lambda)}{45 \text{ nm}}$$

For wavelengths of 435 nm to 490 nm:

$$f(\lambda_{new}) = f(\lambda_{measured}) * \frac{T}{P} + f(\lambda_{measured}) * \left(1 - \frac{T}{P}\right) * \frac{(\lambda - 435 \text{ nm})}{55 \text{ nm}}$$

For wavelengths of greater than 490 nm:

$$f(\lambda new) = f(\lambda measured)$$

However, quadratic, exponential, and other systems for scaling the amount of reflectance reduction applied to a given wavelength may also be performed. With the reduction in reflectance properly applied, the controller proceeds to calibrate the printer by generating a mapping table that correlates halftone patterns to measured optical densities of the sections of the calibration patches. The controller then initiates a profiling process in order to ensure that colors are accurately generated. At this point, the printer is ready for printing.

Figure 10:
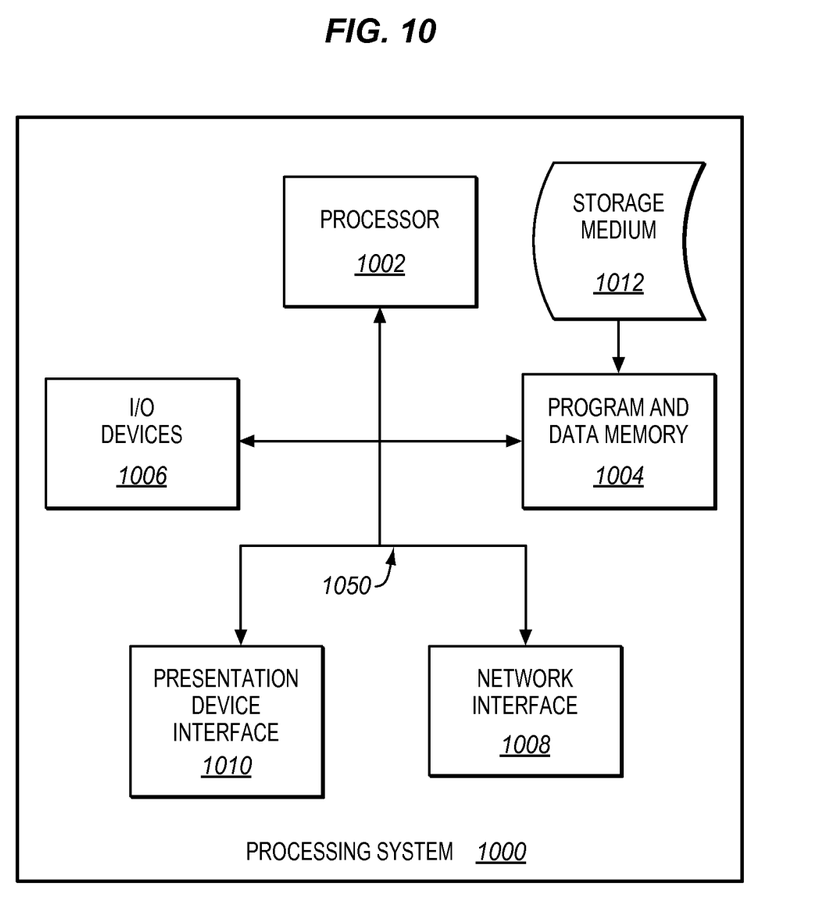
FIG. 10 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of the calibration system of FIG. 2 to perform the various operations disclosed herein. FIG. 10 illustrates a processing system 1000 operable to execute a computer readable medium embodying programmed instructions to perform desired functions in an exemplary embodiment. Processing system 1000 is operable to perform the above operations by executing programmed instructions tangibly embodied on computer readable storage medium 1012. In this regard, embodiments of the invention can take the form of a computer program accessible via computer-readable medium 1012 providing program code for use by a computer or any other instruction execution system. For the purposes of this description, computer readable storage medium 1012 can be anything that can contain or store the program for use by the computer.

Computer readable storage medium 1012 can be an electronic, magnetic, optical, electromagnetic, infrared, or semiconductor device. Examples of computer readable storage medium 1012 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1000, being suitable for storing and/or executing the program code, includes at least one processor 1002 coupled to program and data memory 1004 through a system bus 1050. Program and data memory 1004 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1006 (including but not limited to keyboards, displays, pointing devices, etc.) can be coupled either directly or through intervening I/O controllers. Network adapter interfaces 1008 may also be integrated with the system to enable processing system 1000 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 1010 may be integrated with the system to interface to one or more presentation devices, such as printing systems and displays for presentation of presentation data generated by processor 1002.

Although specific embodiments were described herein, the scope of the invention is not limited to those specific embodiments. The scope of the invention is defined by the following claims and any equivalents thereof.

We claim:

1. A system comprising:
a controller operable to acquire measured reflectance values for a blank portion of a print medium, to analyze the measured reflectance values for the blank portion to determine if optical brighteners have been added to the print medium, and to acquire measured reflectance values for colorant applied to the print medium by a printer,
wherein the controller is further operable, if it determines that optical brighteners have been added to the print medium, to reduce the measured reflectance values for the colorant, and to initiate a calibration for the printer using the reduced reflectance values for the colorant,
wherein the controller is further operable, if it determines that optical brighteners have not been added to the print medium, to initiate the calibration for the printer using the originally measured reflectance values for the colorant,
wherein the calibration defines amounts of colorant to add to the print medium in order to generate particular colors on the print medium,
wherein the controller is further operable to reduce a reflectance value for the colorant applied to the print medium at each of multiple wavelengths by:
acquiring a measured reflectance value (R) of the print medium for the wavelength;
comparing R to a predefined first threshold value (T1);
responsive to determining that R is larger than T1, reducing the measured reflectance value for the colorant in the wavelength by a first factor (F1);
responsive to determining that R is not larger than T1, comparing R to a predefined second threshold value (T2); and
responsive to determining that R is greater than T2, reducing the measured reflectance value for the colorant in the wavelength by a second factor (F2).

2. The system of claim 1 wherein:
the optical brightener is substantially transparent, and
the controller is further operable to reduce the reflectance values for the colorant based on reflectance values for the blank portion of the print medium in a wavelength corresponding to a color of the optical brightener added to the print medium.

3. The system of claim 1 wherein:
the controller is further operable to reduce the measured reflectance values for the colorant based on reflectance values for the print medium corresponding to a blue spectrum of light.

4. The system of claim 3 wherein:
a blue spectrum corresponds to wavelengths of light between about 390 nanometers and about 480 nanometers.

5. The system of claim 3 wherein:
the controller is further operable to reduce the measured reflectance values for the colorant in the blue spectrum of light such that the reflectance values do not exceed a threshold value.

6. The system of claim 1 wherein:
the controller is further operable to identify a halftone pattern used in applying the colorant onto the print medium, to calculate an optical density for the colorant based on the reduced reflectance values for the colorant, and to calibrate the printer by correlating the halftone pattern to the calculated optical density.

7. The system of claim 1 wherein:
reducing a reflectance value is performed only upon a yellow calibration patch, and only upon pale sections of the yellow calibration patch.

8. The system of claim 1 wherein:
the controller is further operable to reduce the measured reflectance values for the colorant applied to the print medium responsive to determining that a reflectance value for the print medium is above a threshold value.

9. A method comprising
acquiring measured reflectance values for a blank portion of a print medium;
analyzing the measured reflectance values for the blank portion to determine if optical brighteners have been added to the print medium;
acquiring measured reflectance values for colorant applied to the print medium by a printer;
if optical brighteners have been added to the print medium:
  reducing the measured reflectance values for the colorant based on the measured reflectance values of the print medium; and
  initiating a calibration for the printer using the reduced reflectance values for the colorant, wherein the calibration defines amounts of colorant to add to the print medium in order to generate particular colors on the print medium; and
if optical brighteners have not been added to the print medium:
  initiating the calibration process for the printer using the originally measured reflectance values for the colorant;
wherein reducing the measured reflectance values for the colorant comprises, for each of multiple wavelengths:
  determining a reflectance value (R) of the print medium for the wavelength;
  comparing R to a predefined first threshold value (T1);
  responsive to determining that R is larger than T1, reducing the determined reflectance value for the colorant in the wavelength by a first factor (F1);
  responsive to determining that R is not larger than T1, comparing R to a predefined second threshold value (T2); and
  responsive to determining that R is greater than T2, reducing the determined reflectance value for the colorant in the wavelength by a second factor (F2).

10. The method of claim 9 wherein:
reducing the reflectance values for the colorant comprises:
  reducing the reflectance values for the colorant based on reflectance values for the blank portion in a wavelength corresponding to a color of the optical brightener added to the print medium.

11. The method of claim 9 wherein:
reducing the reflectance values for the colorant comprises:
  reducing the reflectance values for the colorant based on reflectance values for the print medium corresponding to a blue spectrum of light.

12. The method of claim 11 wherein:
a blue spectrum corresponds to wavelengths of light between about 390 nanometers and about 480 nanometers.

13. The method of claim 11 further comprising:
reducing the measured reflectance values for the colorant in the blue spectrum of light such that the reflectance values do not exceed a threshold value.

14. A non-transitory computer readable medium embodying programmed instructions which, when executed by a processor, are operable for performing a method comprising:
acquiring measured reflectance values for a blank portion of a print medium;
analyzing the measured reflectance values for the blank portion to determine if optical brighteners have been added to the print medium;
acquiring measured reflectance values for colorant applied to the print medium by a printer;
if optical brighteners have been added to the print medium:
  reducing the measured reflectance values for the colorant based on the measured reflectance values of the print medium; and
  initiating a calibration for the printer using the reduced reflectance values for the colorant, wherein the calibration defines amounts of colorant to add to the print medium in order to generate particular colors on the print medium; and
if optical brighteners have not been added to the print medium:
  initiating the calibration process for the printer using the originally measured reflectance values for the colorant
wherein reducing the measured reflectance values for the colorant comprises, for each of multiple wavelengths:
  determining a reflectance value (R) of the print medium for the wavelength;
  comparing R to a predefined first threshold value (T1);
  responsive to determining that R is larger than T1, reducing the determined reflectance value for the colorant in the wavelength by a first factor (F1);
  responsive to determining that R is not larger than T1, comparing R to a predefined second threshold value (T2); and
  responsive to determining that R is greater than T2, reducing the determined reflectance value for the colorant in the wavelength by a second factor (F2).

15. The medium of claim 14 wherein:
reducing the reflectance values for the colorant comprises:
  reducing the reflectance values for the colorant based on reflectance values for the blank portion in a wavelength corresponding to a color of the optical brightener added to the print medium.

16. The medium of claim 14 wherein:
reducing the reflectance values for the colorant comprises:
  reducing the reflectance values for the colorant based on reflectance values for the print medium corresponding to a blue spectrum of light.

17. The medium of claim 14 wherein:
a blue spectrum corresponds to wavelengths of light between about 390 nanometers and about 480 nanometers.

18. The medium of claim 14, wherein the method further comprises:
reducing the measured reflectance values for the colorant in the blue spectrum of light such that the reflectance values do not exceed a threshold value.

19. The medium of claim 14, wherein the method further comprises:
identifying a halftone pattern used to apply the colorant onto the print medium;

calculating an optical density for the colorant based on the reduced reflectance values for the colorant; and calibrating the printer by correlating the halftone pattern to the calculated optical density.

20. The medium of claim 14 further comprising:

reducing a reflectance value is performed only upon a yellow calibration patch, and only upon pale sections of the yellow calibration patch.

\* \* \* \* \*